Jan. 16, 1968  H. D. BAUMANN  3,363,460
STEAM CALORIMETER
Filed Feb. 1, 1965

INVENTOR.
HANS D. BAUMANN

# United States Patent Office 3,363,460
Patented Jan. 16, 1968

3,363,460
STEAM CALORIMETER
Hans D. Baumann, Sharon, Mass.
(Route des Isles, 14 Conde-sur-Noireau, Calvados, France)
Continuation-in-part application Ser. No. 213,232, July 30, 1962. This application Feb. 1, 1965, Ser. No. 441,945
3 Claims. (Cl. 73—192)

ABSTRACT OF THE DISCLOSURE

The present invention relates to a device capable of measuring and indicating the ratio between two independently variable pressure levels existing between the entrance to and a location near the vena contracta of an orifice, consisting of an orifice arrangement and a mechanical measuring apparatus capable of determining the ratio between said two pressure levels by balancing a tiltable beam subjected to a force generated by each pressure level on a curved bearing surface, and wherein the geometric relationship between the tilted beam and said bearing surface determines said pressure ratio which, in turn, may be used as an indication of the moisture content of steam passing said orifice arrangement.

---

This application is a continuation-in-part of my application, Ser. No. 213,232, filed July 30, 1962, now abandoned.

This invention relates to a device capable of measuring the amount of moisture or superheat in a sample of steam. It is important to know whether or not steam is wet or superheated for flow measuring purposes or to avoid impingement of liquid droplets on turbine blades in order to prevent erosive effects.

Steam calorimeters presently employed are usually of the throttling or superheating type. Although these devices are accurate, they require the reading of pressure and temperature plus some amount of calculation with the aid of steam tables in order to determine the amount of moisture. Since this process requires manual observation and the necessary calculation, a certain time lag is required between readings, making this method not very desirable for automatic control purposes.

The present invention has for an important object the ability to read directly from a calibrated gage the percentage of moisture content at any time and as a continuous process. Furthermore, additional means can be incorporated in this device to telemeter the results to a remote observation post or to trigger limit switches as preset levels to warn operating personnel in case the moisture exceeds a safe value.

The main metering element of the invention measures the ratio between the static pressure of sample steam passing a nozzle at the point of maximum velocity at the so called "Vena Contracta" and the static pressure existing at the entrance of said nozzle.

It is well understood, that, whenever dry saturated steam passes such a nozzle, the ratio between the pressure at the vena contracta ($P_2$) and the nozzle inlet ($P_1$) will be 0.58. However, this ratio increases whenever moisture is present within the steam. The ratio $P_2/P_1$ can be calculated first by assuming that steam and water flow as a homogeneous mixture and that this mixture does expand isentropically or under constant entropy conditions.

Then, for a number of possible throat pressures $P_2$, a selected inlet pressure $P_1$ and steam quality X, the mass flow G is calculated as follows:

$$G = \frac{C}{V_2}$$

where C is the steam velocity given by:

$$C = \sqrt{H_2 - H_2 k}$$

and $V_2$ the specific volume at $P_2$:

$$V_2 = X_2 V_{g2} + (1 - X_2) V_{f2}$$

$$X_2 = \frac{(S_{f1} + X_1 S_{fg1}) - S_{f2}}{S_{fg2}}$$

where $V_g$ is the specific volume of the steam and $V_f$ is the specific volume of the liquid, while H refers to the enthalpy and S to the entropy of the mixture.

One will find from these calculations that at a certain throat pressure $P_2$ (and corresponding values $X_2$, $H_2$ and $V_2$) a maximum amount of mass flow G can be obtained. Since under critical flow conditions such as these the thermodynamic equilibrium will demand maximum possible mass flow, it is at once apparent, that this will determine pressure $P_2$, which in turn allows the determination of $X_1$ or the initial steam quality per given ratio of that cricical pressure $P_2$ to the initial pressure $P_1$.

For example, a steam sample of 100 p.s.i.a. pressure and $X=90\%$ steam will have a critical throat pressure $P_2$ of 61.5 p.s.i.a. or a $P_2/P_1$ ratio of 0.615. A similar sample of 90% quality steam at 200 p.s.i.a. initial pressure will have a $P_2$ critical of 123 p.s.i.a. or again a $P_2/P_1$ ratio of 0.615, indicating that this method of determining steam quality is quite independent over a broad range of pressure variations.

The mechanism of obtaining the ratio between $P_2$ and $P_1$ will best be understood from the following detailed description of my invention, taken in connection with the accompanying drawings forming part thereof, in which.

Figure 1:
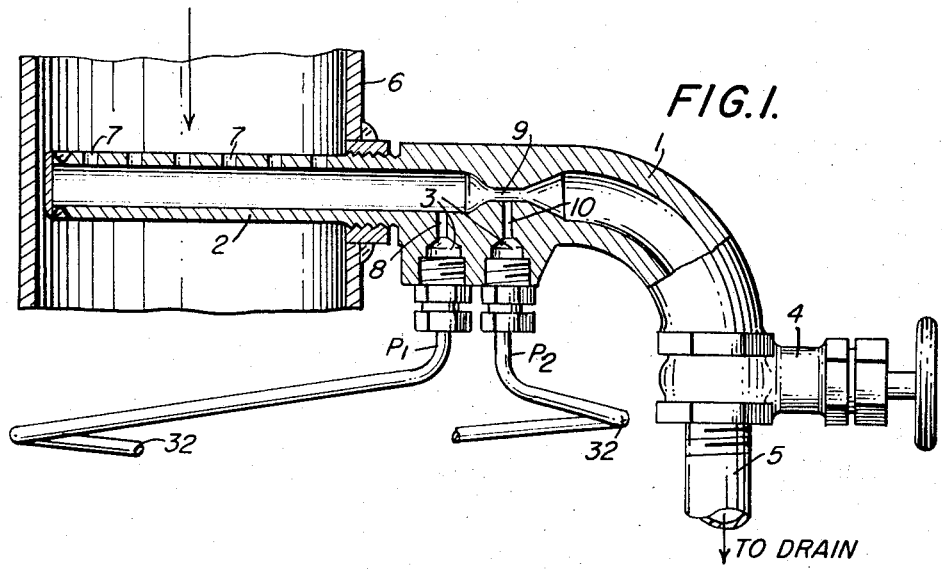
FIG. 1 is a vertical, central, cross-sectional view of a preferred orifice system.

Referring to the annexed drawing which shows my invention in a vertical, central cross-sectional view, attention is drawn to the measuring element, FIG. 1, consisting of a housing 1, a sampling tube 2, two measuring ports 3, a shut-off valve 4, and a drain pipe 5.

The sampling tube 2 is inserted in a main steam line 6 and has a number of openings 7 facing the flowing steam. A sample portion of the steam to be measured flows towards the center portion of housing 1, where its pressure ($P_1$) is sensed through port 8. In continuing, the steam is rapidly accelerated passing through a nozzle 9. The static pressure ($P_2$) at this point of maximum velocity is sensed through port 10. After this throttling process the steam is allowed to leave the measuring portion through a suitable drain pipe 5. A hand valve 4 serves to close the system in case no measurement is needed.

Figure 2:
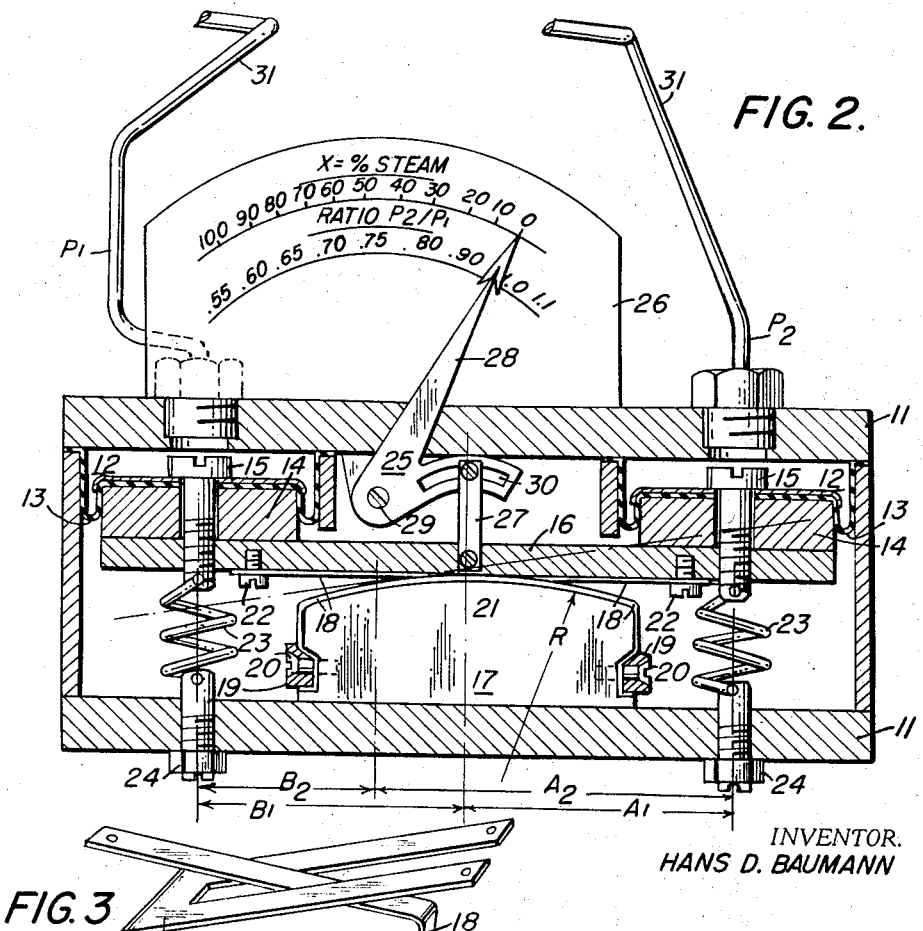
FIGURE 2 is a vertical, central, cross-sectional view of the measuring portion of my invention.
Figure 3:
FIGURE 3 is a perspective view, on a slightly larger scale, of a flexible spring shown otherwise as item 18 in FIGURE 2.

Referring now to the lower portion of the annexed drawing, FIG. 2, the ratio metering element of my invention is shown. It consists of a housing 11 containing within two opposed vertical openings 12 elastic bellows or diaphragms 13 made of molded elastomer. These bellows are supported at their flexible center portion by pistons 14 and are, with the aid of screws 15, solidly connected to a common beam 16. The latter beam is in turn supported by a curved bearing block 17 which upper bearing surface 21 is machined in a certain radius R, as indicated. In order to prevent beam 16 from slipping off the bearing block 17, a flexible spring 18 is employed. The latter, more clearly shown in FIG. 3, consists of two parts crossing each other in such a manner that, after being connected to beam 16 by means of screws 22 and being tightened by key 19 and screws 20, their resultant axial loads cancel each other out and keeping beam 16 in center position without imposing undue strain in the latter and without refraining beam 16 from tilting around radius R.

Tilting movement of beam 16 is the result of an imbalance in pressure between the two bellows 13. Assuming pressure $P_1$ and $P_2$ are identical, then the beam would be balanced and distance $A_1$ will equal $B_1$ and the ratio $P_2/P_1=1$. However, assuming the pressure $P_1$ and consequently the force exerted by the left hand bellows is higher than that of the opposing bellows, the beam 16 will tilt down—indicated by a dotted line—thereby rolling over curved surface 21. While tilting over surface 21, the pivot point moves to the left and changes the effective length between the latter and either bellows respectively. The system will be in balance again once the force of bellows $P_1$ times distance $B_2$ equals the force of bellows $P_2$ times distance $A_2$, or, the ratio $A_2/B_2$ is equal to the ratio of the pressure $P_1/P_2$.

A coiled tension spring 23 is fastened to the center of each of the bellows 13 adding a selected force to the one imposed by the fluid pressure acting on said bellows. The tension of springs 23 may be varied by suitable means of adjustment 24 to be equal in force to a pressure of 14.7 p.s.i. acting on either bellows 13, thus converting $P_1$ or $P_2$ into an absolute pressure reading as is required in this particular application.

As explained before, a tilt of beam 16 is the function of the ratio $P_2/P_1$. An indicating device 25 is now used in conjunction with a calibrated scale 26 to give visual expression of this pressure ratio. The indicating device consists of a bar 27 which transmits motion of beam 16 to an indicator 28. The latter has a fulcrum point 29 and an elongated slot 30. The upper connection of bar 27 may be clamped at a selected portion of slot 30 in order to obtain the desired amount of deflection of indicator 28 per given movement of beam 16.

The measuring device of FIG. 1 and the metering portion FIG. 2 are connected by coiled metal tubing 31 which connects pressure ports 3 with the respective bellows 13. The coiled section 32 of the tubing serves to provide a waterleg between the hot steam and the instrument shown in FIG. 2.

The invention has been disclosed in connection with a specific embodiment of the same, but it will be understood that this is intended by way of illustration only and that numerous changes can be made in the construction and arrangement of parts such as curving the lower surface of beam 16 in FIG. 2 instead of block 17 or by curving either surface, and employing bourdon tubes instead of bellows in the metering element without departing from the spirit of the invention or the scope of the appended claims.

Having thus clearly shown and described the invention, what is claimed as new and desired to secure by Letters Patent is:

1. In combination, a throttling orifice having pressure transmitting ports located at the fluid inlet side and at the vena contracta of said orifice respectively, and means located exteriorly of said orifice for measuring the ratio between pressures at said two ports, comprised of a frame having integrally mounted expandable pressure sensing devices, a beam, said expandable pressure sensing devices mounted with their axes parallel and having one end fixed on said frame, the other free and closed end attached to each terminating portion of said beam, a support structure secured on said frame having a bearing surface in form of an arc, said beam being tiltingly engaged and solely supported by said bearing surface thereby enabling said beam to vary the point of support and therefore the effective pivot point in respect to the relative location of said expandable pressure sensing devices, and means for indicating tilting motion of said beam in response to expansion of said pressure sensing devices.

2. The combination with a throttling orifice comprising a housing having an intake port, consisting of a perforated tube, and exhaust port with suitable closing means, an orifice connecting both intake and exhaust, pressure ports communicating with said intake port and said orifice, and means located exteriorly of the housing for measuring the ratio between a fluid pressure entering said housing and the pressure of the fluid passing said orifice, comprised of a frame having integrally mounted expandable pressure sensing devices, a beam, said expandable pressure sensing devices mounted with their axes parallel and having one end fixed on said frame, the other free end closed end attached to each terminating portion of said beam, a support structure secured on said frame having a bearing surface in form of an arc, said beam being tiltingly engaged and solely supported by said bearing surface thereby enabling said beam to vary the point of support and therefore the effective pivot point in respect to the relative location of said expandable pressure sensing devices, and means for indicating tilting motion of said beam.

3. Structure as claimed in claim 1 wherein said beam is restrained and secured to said bearing surface in direction of the beam axis by means of a flexible metal strip.

References Cited

UNITED STATES PATENTS

| | | | |
|---|---|---|---|
| 550,814 | 12/1895 | Barrus | 73—192 |
| 1,588,178 | 6/1926 | Fales | 73—407 X |
| 1,726,463 | 8/1929 | Wunsch | 73—192 X |
| 1,795,250 | 3/1931 | Connet | 73—213 X |
| 1,944,339 | 1/1934 | Wunsch | 73—202 |
| 2,340,008 | 1/1944 | Matuszak | 73—205 |
| 2,978,907 | 4/1961 | Stover | 73—205 X |
| 3,062,053 | 11/1962 | Weber | 73—407 |
| 3,211,004 | 10/1965 | Spencer | 73—407 X |

RICHARD C. QUEISSER, *Primary Examiner.*

JAMES GILL, *Examiner.*

J. J. SMITH, JOHN P. BEAUCHAMP,
*Assistant Examiners.*